US011632588B2

(12) United States Patent
Yelda et al.

(10) Patent No.: US 11,632,588 B2
(45) Date of Patent: Apr. 18, 2023

(54) MEASURING THE PERFORMANCE OF A PEER-MANAGED CONTENT DISTRIBUTION NETWORK

(71) Applicant: Kollective Technology, Inc., Bend, OR (US)

(72) Inventors: Sylvana Yelda, Bend, OR (US); Garrett J. Gladden, Bend, OR (US); Rikley A. Buckingham, Oregon City, OR (US); Paul M. Fernandez, Bend, OR (US); Matthew A. Townsend, Bend, OR (US)

(73) Assignee: Kollective Technology, Inc., Bend, OR (US)

( * ) Notice: Subject to any disclaimer, the term of this patent is extended or adjusted under 35 U.S.C. 154(b) by 0 days.

(21) Appl. No.: 17/541,949

(22) Filed: Dec. 3, 2021

(65) Prior Publication Data
US 2022/0182718 A1 Jun. 9, 2022

Related U.S. Application Data

(60) Provisional application No. 63/121,387, filed on Dec. 4, 2020.

(51) Int. Cl.
*H04N 21/442* (2011.01)
*H04L 67/104* (2022.01)
*H04L 67/1061* (2022.01)
*H04L 67/1074* (2022.01)

(52) U.S. Cl.
CPC ... *H04N 21/44218* (2013.01); *H04L 67/1046* (2013.01); *H04L 67/1068* (2013.01); *H04L 67/1074* (2013.01); *H04N 21/44222* (2013.01)

(58) Field of Classification Search
None
See application file for complete search history.

(56) References Cited

U.S. PATENT DOCUMENTS

| | | | |
|---|---|---|---|
| 8,494,004 B2* | 7/2013 | Dettori | H04L 67/1053 370/468 |
| 2010/0011103 A1* | 1/2010 | Luzzatti | H04L 63/10 709/234 |

(Continued)

*Primary Examiner* — Alexander Q Huerta
(74) *Attorney, Agent, or Firm* — Park, Vaughan, Fleming & Dowler LLP (57) ABSTRACT

A system and method are provided for measuring the performance of a synthetic peer-managed content distribution network. Each node peers with one or more other nodes to share the content and facilitate its presentation to associated users. Each node collects session metadata for identifying the node's environment, presentation events regarding presentation of the content to users, and transfer events regarding the sharing of the content among peers. The nodes report their data toward a central entity that feeds the different types of data through different ETL pipelines to obtain the performance measurements. For example, the session metadata may allow the reach of a content item to be determined, the presentation events may be used to determine the quality of experience with the content item for users, and the transfer events may be used to determine how much external bandwidth the network conserved and/or how efficiently the nodes shared the content.

21 Claims, 3 Drawing Sheets

(56) References Cited

U.S. PATENT DOCUMENTS

| | | | |
|---|---|---|---|
| 2011/0277009 A1* | 11/2011 | Damola | H04N 21/632 |
| | | | 725/116 |
| 2016/0112295 A1* | 4/2016 | Blankenship | H04L 43/045 |
| | | | 709/224 |
| 2021/0058456 A1* | 2/2021 | Allen | H04L 67/104 |
| 2022/0182444 A1* | 6/2022 | Christensen | H04L 67/1068 |

* cited by examiner

MEASURING THE PERFORMANCE OF A PEER-MANAGED CONTENT DISTRIBUTION NETWORK

RELATED APPLICATION(S)

This application claims the benefit of U.S. Provisional Application No. 63/121,387, which was filed Dec. 4, 2020 and is incorporated herein by reference. Also, this application is related to U.S. patent application Ser. No. 17/541,942, filed even date herewith and entitled "Peer-Managed Content Distribution Network", which is also incorporated herein by reference.

BACKGROUND

This disclosure relates to the field of computer science. More particularly, a system and methods are provided for calculating the performance of a peer-managed content distribution network based on activity of individual nodes in the network.

Existing content delivery networks (or CDNs) facilitate delivery of content (e.g., audio, video, multimedia) to consumers via edge servers located at logical edges of the networks. It is not uncommon for multiple consumers in physical or logical proximity to each other, such as within one subnetwork of a network of an employer or other organization, to access the same content at the same time or at overlapping times. However, with existing CDNs each of these consumers must open a separate connection with a CDN. This requires the organization to maintain separate external connections for each consumer and, if the number of simultaneous consumers is great enough, may cause degraded performance within the organization's network.

The organization may wish to share a lower number of connections with the external source of a popular content item, but may be unable to do so or, if able, may be unable to gauge the effectiveness of its efforts. For example, it may not be able to determine if multiple users were able to use a lower number of connections (instead of having a separate connection for each user), may not be able to determine if the users were able to access the content in a timely manner and, in general, may not be able to determine how well it implemented any attempt to conserve its communication bandwidth.

SUMMARY

In some embodiments, systems and methods are provided for gathering data reflecting activity at member nodes of a synthetic peer-managed content distribution network, and using the data to calculate various performance measurements regarding the nodes and/or the network. The nodes' activities may include establishing persistent connections with peer nodes, sharing or transferring content items or pieces of content items with peers, obtaining a content item (e.g., via peers) for presentation to an associated user, and/or other actions.

The nodes periodically report their activity upward through the network, whereupon reports from different nodes are aggregated and continue on their way to a centralized entity, such as a supervisor service that collects activity data and uses it to generate the various performance measurements. Illustrative measurements may include a count of the number of unique users that access content via the network or via a cluster within the network, an estimated quality of users' experiences accessing content via the network, a measure of the amount of communication bandwidth that an organization obtained by sharing content via the peer-managed network, and a measure of the efficiency with which nodes shared or transferred content.

Resulting performance measurements may be stored for comparison over time, for reporting to organizations that employ a form of a peer-managed network, for automatically modifying the operation of the network (e.g., by changing operating parameters or node connections), for observing results of changes to the network structure or operating parameters, and/or for other purposes.

In some embodiments, measuring the performance of a hierarchical peer-managed content distribution network involves, at multiple nodes participating in the network: establishing persistent connections with at least one peer node, recording events associated with the sharing of a content item via the connections, and reporting the events to a network supervisor. The supervisor subsequently calculates how much communication bandwidth the network conserved. This may illustratively involve dividing the amount (e.g., in bytes) of the content item that was received at the multiple nodes via the persistent connections by a total amount of the content item received at the multiple nodes via all sources and connections.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system and methods are provided for measuring the performance of a hierarchical synthetic peer-managed content distribution network based on self-reported activity of individual nodes. Each node in the network peers with one or more other nodes that may be in logical proximity to the node (e.g., nodes that are at the same level of the hierarchy, nodes one level higher, and nodes one level lower). A collection of nodes that have established peer connections among themselves is called a cluster, and a network may include one or more clusters. Instead of each of the peers importing the content item from a source external to its cluster, as long as one of the peers has the item it can be efficiently shared among them.

Nodes may include hardware nodes and/or software nodes that execute on a variety of host devices (e.g., computers, smartphones, tablets). In addition, some software nodes may be implemented within a browser, while others may be implemented from standalone applications or utilities. Different nodes may therefore have access to different types and amounts of resources (e.g., storage for the content item, network bandwidth, CPU time) and, as a result, perform differently during content distribution.

During the distribution of content, each node accumulates data regarding presentation of the content to a user (e.g., from a media player program or device), information that identifies the user environment, and how much of the content the node received from peers and/or other sources. Different data may be collected and reported in different implementations. The nodes report their data to upstream nodes on a periodic basis, and those nodes report their own data as well as data reported to them, so that all nodes' data are eventually received at the top of the hierarchical network and/or at an entity external to the cluster.

The data may then be used to calculate performance statistics and indicators such as the quality of users' experiences with the content, how many users the content reached, how much communication bandwidth was conserved by sharing the content among peers (e.g., instead of retrieving it from an external source), the efficiency of peering within the network, and/or others. The results may be made available to organizations that operate and/or administer the network, may be used to determine historical trends, and may be used to automatically adjust one or more operating parameters of the peer-managed network.

In some embodiments, data received from network nodes may also (or instead) be used to automatically generate recommendations regarding one or more parameters that affect the configuration and/or operation of a cluster. For example, historical data may be input to a suitably trained machine-learning model to determine whether a cluster of nodes should be increased or decreased in size or population, based on past or projected bandwidth savings.

Figure 1:
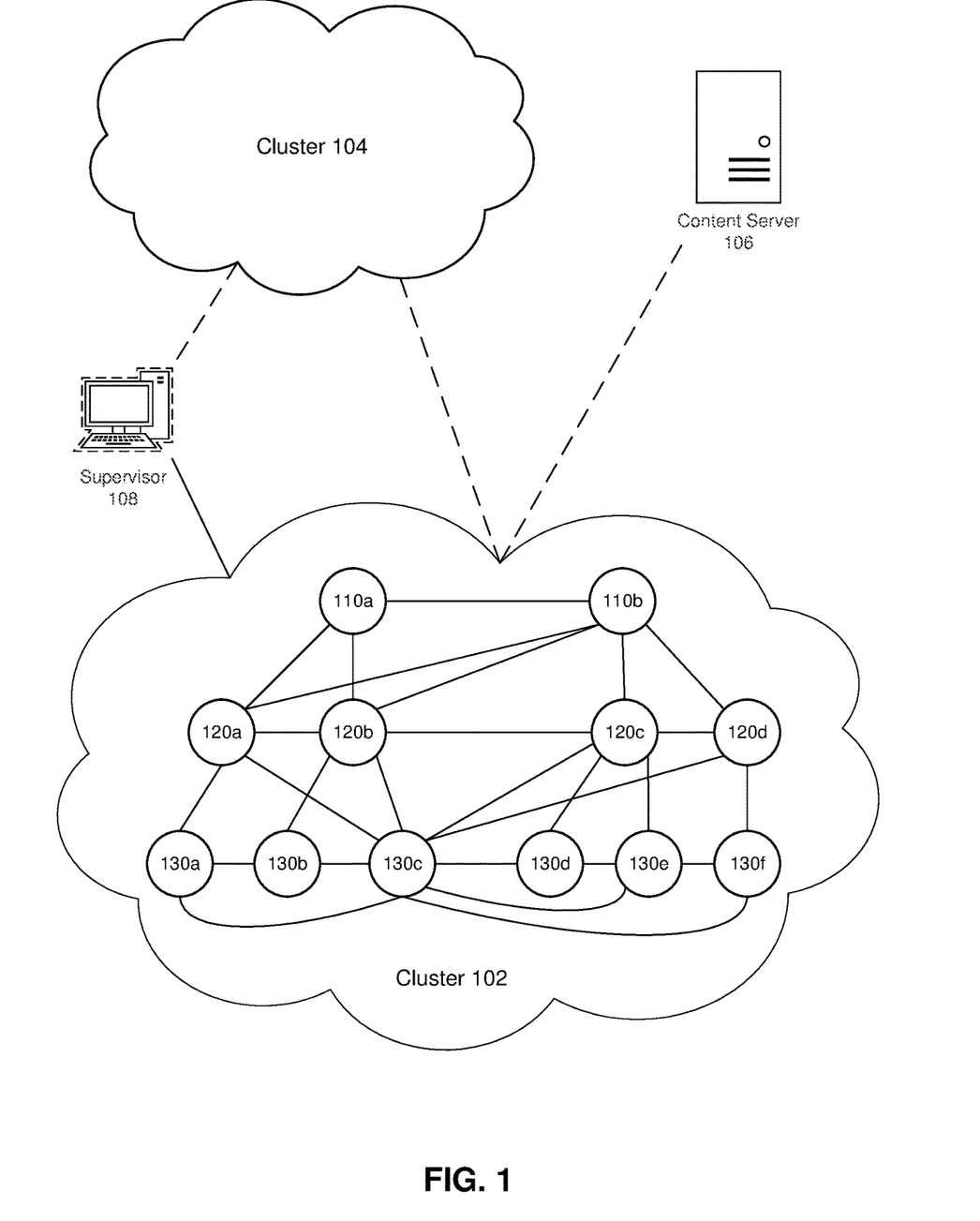
FIG. 1 is a block diagram depicting a computing environment in which the performance of a peer-managed content distribution network may be measured, in accordance with some embodiments.

FIG. 1 is a block diagram depicting a computing environment in which the performance of a synthetic peer-managed content delivery network or cluster may be measured, according to some embodiments. As already described, the network is used both to distribute a content item to network nodes and collect operating and performance data from the nodes.

In these embodiments, cluster 102 is a collection of software nodes created and managed by agents executing on physical and/or virtual devices operated by users that wish to access content, especially passive content (i.e., content that is not interactive). The network may be envisioned as comprising just cluster 102 in some implementations, such as when the content that is distributed through the network is distributed only to members of cluster 102. For example, a single webinar, demonstration, software program or update, live media presentation or other event may reside on or originate from content server 106 or some other source (e.g., a content delivery network) for consumption by users associated with the nodes of cluster 102.

In other implementations, cluster 102 is just part of a larger peer-managed content delivery network. For example, members of cluster 102, cluster 104, and/or other clusters may consume the same content item (or different content items) from content server 106 or elsewhere, in which case clusters 102, 104 may be considered parts of one network. In these implementations, however, each cluster evolves and operates independently of the other(s).

Communication links illustrated in the environment of FIG. 1 may include point-to-point and/or network connections. Networks over which a peer may communicate with another entry may include wide-area networks, public networks (e.g., the Internet), local-area networks, private networks (e.g., private intranets), virtual private networks (VPNs), etc., and may include wired and/or wireless links.

Cluster 102 includes multiple layers of nodes, with the maximum depth of the cluster being one of multiple variables or parameters enforced by members as the cluster evolves. In the illustrated environment, the maximum depth of cluster 102 is three. As used herein, a 'node' is a member of a peer-managed cluster or network. A 'peer' of a given node is another node in the same cluster with which the given node has established a persistent connection in order to share content. As discussed below, a node may be limited in the number of peers it may have (e.g., because of resource constraints).

Nodes of cluster 102 communicate with other nodes of the same cluster according to three types of directional relationships that reflect their relative positions in the cluster: upstream, downstream, and midstream.

Nodes 110*a*, 110*b* are root nodes (or first-level nodes) of the cluster. They engage in midstream communications with each other (assuming they have a peer connection) and engage in downstream communications with any of nodes 120*a*, 120*b*, 120*c*, 120*d* (second-level nodes) with which they establish peer connections. Second-level nodes engage in midstream communications with other second-level nodes with which they peer, upstream communications with any root node(s) with which they peer, and downstream communications with any of nodes 130*a*-130*f* (third-level nodes) with which they establish peer connections. Third-level nodes engage in midstream communications with other third-level nodes with which they establish peer connections, and upstream communications with any second-level nodes with which they peer.

Thus, relative to a given node, an upstream peer is one hop closer to the top or root of the network, a midstream peer is at the same depth, and a downstream peer is one hop lower in the network or graph. When a node shares content with a midstream or downstream peer it may transmit the entire item or may share it in pieces, which may be measured in byte ranges, time-based segments (e.g., a content item may be logically divided into segments that correspond to one second or multiple seconds of playtime), tracks, blocks, and/or other components.

A node attempts to obtain sufficient pieces of a content item in a sufficiently timely manner to allow a media player that presents the content to a user to provide a continuous viewing experience (e.g., without buffering or stalling once the content item starts playing). Data reflecting the presentation of a content item to a user can be used to calculate a quality of experience (or QoE) for the user. In addition, the data may be aggregated to obtain an aggregated QoE for all users that received the item or all users within one cluster or network that received the item, may be used to measure latency or seek times experienced by one or more users, and/or yield other useful information.

When a node cannot obtain a content item from a peer, or a particular piece of a content item, that node or a node higher in the network that acts on the node's behalf may retrieve the item (or the piece of the item) from an external entity (e.g., a content source). By determining how much of a content item is received from peers versus external entities, the bandwidth savings provided by the peer-managed network can be measured.

Supervisor 108 is a central server (or set of servers) or a service (e.g., a statistics service) that executes on one or more computer systems to receive various environmental and/or behavioral data from network nodes, and that processes the data to yield several performance measurements and/or indicators. This output may be provided to organizations that use or manage the network, and may be used to manually or automatically modify operation of the network or a cluster.

In some embodiments, nodes in a hierarchical synthetic peer-managed content distribution network report operating and performance data upward through the network in a manner described in U.S. Patent Application No. 17/xxx, xxx, which is entitled "Peer-Managed Content Distribution Network" and was filed the same day as the instant application, and which is incorporated herein by reference. Because nodes' data are reported to supervisor 108 on a regular or periodic basis, techniques described herein for measuring the performance of the network and/or components of the network may be repeated on a regular basis as well.

In some implementations, the supervisor receives the data described herein (e.g., as JSON or JavaScript® Object Notation records), and processes the data through one or more ETL (Extract, Transform, Load) pipelines to compute various measures regarding the effectiveness and operation of the peer-managed network(s) it supervises. For example, each type of data reported by nodes may be treated as a separate stream and processed through a separate ETL pipeline.

In some embodiments, the data reported by nodes includes session metadata, content presentation events, and content transfer events. Other embodiments may use other data in addition to (or instead of) these data. In particular, configuration data regarding a node's cluster may also be reported, such as the total number of nodes in the cluster, the number of peer connections the node has established, etc.

Session metadata identifies a user that accesses content via the peer-managed network and/or the operating environment of the node that obtains the content for the user. Session metadata may include information that does or does not persist across user sessions, wherein each session may correspond to a different content item, a different network node working on the user's behalf, a different application or player for presenting the content item to the user, etc. For example, one or more unique identifiers of the user (e.g., a login id, a username), the browser (e.g., a browser cookie), or an installed application that spawns a node to obtain the user's desired content, and/or the node itself may be used as (or combined to yield) a user identifier for counting a number of users of the network that consume a given content item.

Content presentation events (or "play events") relate to the presentation of a content item to a user by a media player. The events may include some or all actions related to the presentation, such as play, pause, stop, seek, wait, stall, and so on, along with corresponding timestamps and/or durations. Thus, every event that reflects the presentation of the content item to the user and/or that involves something that degrades or that may degrade the user's enjoyment (e.g., buffering) may be captured at the node and reported.

Content transfer events (or just "transfer events") relate to the transfer or sharing of content between peers. An illustrative event may capture, in addition to an identifier of the node that receives content, an identifier of the source of the content transfer (e.g., another peer, a content source external to the node's cluster), an amount of content that was received, a duration of time necessary to receive the content, etc. The amount of content transferred may be measured in bytes, time segments, blocks, or other components.

Each content item distributed via a peer-managed network or cluster may have a unique identifier, as may separate pieces of the item if it is physically or logically partitioned. Therefore, each report that involves the presentation or sharing of a content item will identify the content item (or content item piece(s)) involved in the activity.

Each type of data reported by network nodes may be aggregated into a separate data stream received by a supervisor or other entity that subscribes to the stream. One or more entities may subscribe to any or all streams in order to calculate multiple performance measures of nodes, clusters, and/or an entire network.

Figure 2:
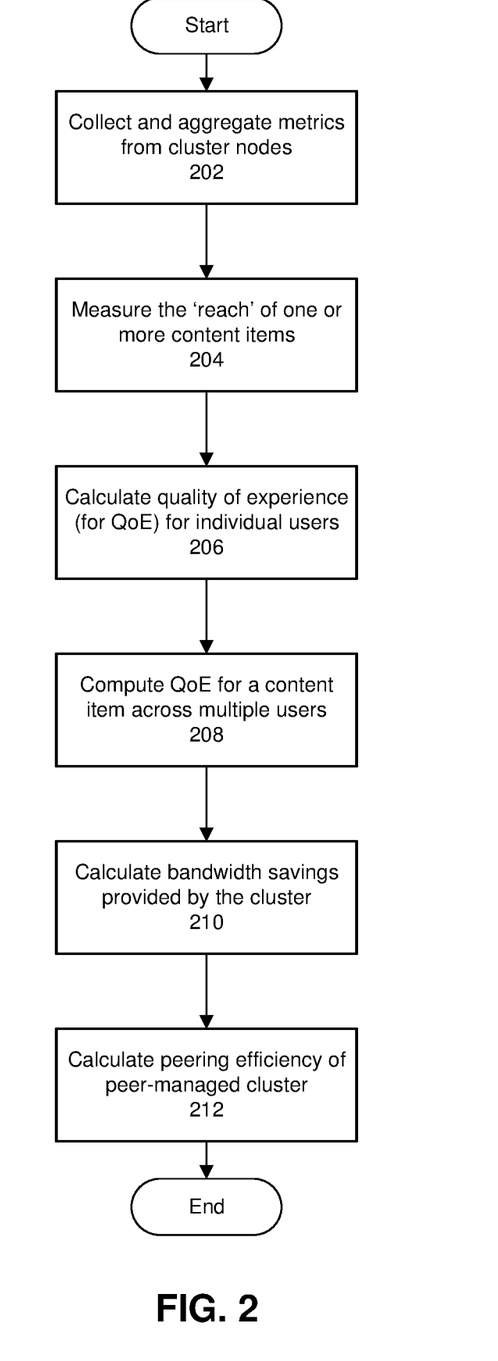
FIG. 2 is a flow chart illustrating a method of measuring the performance of a peer-managed content distribution network, in accordance with some embodiments.

FIG. 2 is a flowchart illustrating a method of measuring the performance of a peer-managed content distribution network, according to some embodiments. In one or more embodiments, one or more of the operations may be omitted, repeated, and/or performed in a different order. Accordingly, the specific arrangement of steps shown in FIG. 2 should not be construed in a manner that limits the scope of the embodiments.

In operation 202, network nodes report information regarding their environments and activity (e.g., the types of data described above). Every node that receives a report or set of reports from a downstream node forwards the received report(s) in addition to sending its own. One or more nodes at or near the top of the network or network cluster (e.g., all root nodes) forward the combined reports to an entity that will consume the data and produce performance data (e.g., supervisor 108 of FIG. 1). Although the remainder of the illustrated method involves characterizing the performance of nodes within one cluster, it will be understood that the method is not limited in this regard.

In operation 204, the supervisor uses the collected data to measure the number of unique users or consumers for one or more specific content items, which may be considered the 'reach' of the items. Although a unique user or consumer identifier may be assigned to each user, those identifiers might not always be available to a node when it reports access to the content item by a user (e.g., when a user opens a session to access a particular content item). Also, in some embodiments, the information used to generate a user identifier may be limited to imprecise and/or non-persistent information.

For example, the nodes spawned to obtain content desired by users may or may not be able to access or report precise user-identifying information. A node may attempt to report the most precise information available on its platform and in its operating environment (e.g., a unique user id assigned by the user's organization), but may be limited to reporting its own identifier, an identifier of a browser within which the node was spawned, etc.

A reach value may be aggregated over time. If different user information becomes available during that time (e.g., because an organization permits collection of more persistent and precise user identifiers), the accuracy of the value will increase. Otherwise, an aggregate reach value for a content item will grow naturally as more users consume the item.

In operation 206, the supervisor calculates the quality of experience or QoE regarding presentation of a content item to one or more users associated with the cluster nodes that reported their data to the supervisor. In some implementations, this value is computed with regard to each user as the total amount of time a media player spent playing or presenting the content to the user (the total play time) divided by the sum of the total play time and all time periods during which content was sought but not available. The latter may include a wait time covering the time spent buffering prior to initial playback of the content item and all time periods during which playback stalls while content is not available (e.g., during buffering or seeking of additional pieces of the content).

The wait time experienced by a user n regarding the content item may be represented as $t_{wait,n}$ and the total time spent stalled may be represented as $t_{stall,n}$. The total time that the content actually plays for user n can be written as $t_{play,n}$, and the sum total of time user n plays the content item or waits for the content item to load (e.g., the total time of engagement of the user with the content item) is written as $T_n$, wherein $T_n=t_{play,n}+t_{wait,n}+t_{stall,n}$. Therefore, QoE for user n is expressed as $QoE_n=t_{play,n}/T_n$. Time may be expressed in seconds, milliseconds, or some other units.

A QoE calculated as described above will yield a value between zero and one, which may be multiplied by 100 or otherwise adjusted for easier comparison and/or reporting. In some implementations, when a QoE is reported, it may be translated from a numerical value to a textual or graphical description. For example, depending on where in the range of zero to one the raw value falls, the QoE may be reported as "Poor," "Bad," "Fair," "Good," or "Excellent," or different icons or emojis may be used. Different descriptions may be used in different implementations.

In operation 208, the supervisor calculates an overall QoE regarding one or more content items, across all users that accessed the items. For example, on a regular basis and/or after all users that requested a particular content item within the cluster have finished it (e.g., they closed their media players, the nodes spawned for the item have terminated), the supervisor may calculate or recalculate a content item-specific $QoE_{item}$.

In some implementations, the quality of experience for a particular content item may be computed using sums of the metrics identified above. For example, the total play time of the content item to all users that played it may be summed and represented as $\Sigma t_{play}$ while the total amount of user engagement with the item can be written as $\Sigma T$. Therefore, $QoE_{item}=\Sigma t_{play}/\Sigma T$.

In operation 210, the bandwidth savings or conservation provided by the peer-managed cluster is measured with regard to a content item distributed via the cluster. From the content transfer events reported by network nodes, the supervisor can calculate the amount of content received by each node (e.g., in terms of bytes) and identify where that content came from. In particular, the supervisor can determine the total amount of content each node received, how much of it came from the node's peers, and how much came from outside the cluster (e.g., an origin server).

It may be noted that, within a given cluster of nodes, at least one node (e.g., an initial root node) must receive a given content item from a source external to the cluster (unless the content is sourced within the cluster). Thereafter, however, every transfer of the item that occurs between peers without accessing an external source reduces the cluster's reliance on external sources and conserves more of the bandwidth of the communication link(s) between the cluster and the external sources.

In the illustrated method, bandwidth savings are measured by aggregating all amounts of content received by cluster nodes via peer transfers ($c_{pt}$) and dividing that value by the total amount of content received by the nodes, including transfers from outside the cluster ($c_{ot}$). In particular, savings $s=(c_{pt}/(c_{pt}+c_{ot}))$. The savings value may be multiplied by 100 for purposes of reporting to a user's organization, comparing with values computed at other times, etc.

The result will be a value greater than or equal to zero and less than one when computed across all nodes of a cluster. Bandwidth savings may be reported with different granularities. For example, while the savings may be reported for a single content item distributed in one cluster, in other implementations it may be computed for a group of peers (e.g., a "peering group") within a cluster, for one or more items across multiple or all clusters, for multiple specific items across all clusters that distributed the items, for all clusters that are created in a particular locality (e.g., an organizational subnetwork), etc.

In some implementations, some nodes and their reported data (if they reported any) may be omitted from calculations of bandwidth savings. For example, some nodes may not be permitted to peer (e.g., because they are connected via VPNs or other remote communication links). Other nodes may be in singleton clusters, meaning that they are the only nodes in their clusters because no other users in their locality or subnetwork (and who would normally join the same cluster) are accessing the same content item during the same time period.

In operation 212, the supervisor calculates a peering efficiency of the cluster and/or for a given content item distributed through the cluster or the network that encompasses the cluster. A typical cluster can never achieve perfect 100% bandwidth savings for the item, because at least one copy of the item must be imported from outside the cluster. However, from the content transfer events reported by cluster nodes, the supervisor can calculate peering efficiency as a measure of how close the cluster came to the maximum possible bandwidth savings during distribution of the item.

As already indicated, the maximum bandwidth savings are achieved when only one copy of the content item is imported to the cluster and all member nodes of the cluster except the one that imported the item subsequently received their copies from peers within the cluster. Thus, for a cluster containing m members, the maximum bandwidth savings $S_{max}$ can be computed as $S_{max}=(m-1)/m$. The maximum bandwidth savings for a given cluster k can be represented as $S_{max,k}$.

The actual bandwidth savings of a particular cluster k is calculated based on a form of the equation above for calculating the bandwidth savings or conservation associated with a particular content item. Instead of calculating the savings for the item across an entire cluster, however, we calculate the savings s exhibited by a particular node n as $s_n=(c_{pt,n}/(c_{pt,n}+c_{ot,n}))$. Then we can sum the values for all m members of cluster k and take the average to obtain the average bandwidth savings $s_g$ across the cluster: $s_c=(1/m)*\Sigma(c_{pt,n}/(c_{pt,n}+c_{ot,n}))$.

From the average bandwidth savings, the supervisor calculates the peering efficiency e of cluster k (with m members) as the ratio of the average savings to the maximum possible savings: $e_{c,k}=s_{c,k}/S_{max,k}$. Finally, the peering efficiency of the entire network (E), with regard to the distribution of the content item, is computed as a weighted average of the efficiencies of all clusters' efficiencies, weighted by their populations m, wherein $m_k$ is the population of cluster k. Therefore, across all clusters, $E=\Sigma(e_{c,k}*m_k)/\Sigma m_k$.

After operation 212, the illustrated method ends, although the reporting of nodes' data and/or generation of the performance measurements may regularly repeat as long as the cluster or network exists.

Observed and/or measured performance data, such as the values computed in FIG. 2 may be used to modify a peer-managed network or cluster. For example, if a node is informed (e.g., by the supervisor) or becomes aware (e.g., from data reported upward by downstream nodes) that content transfers to or from that node experience more latency (e.g., on average) than other peer connections, it may detach from its existing location and reattach elsewhere, in the same or a different cluster.

In some embodiments, in addition to or instead of generating measures of the performance of a synthetic peer-managed content distribution network, recommendations are made regarding the configuration of the network. These embodiments are implemented in environments in which nodes in a network are constrained by subnetwork boundaries to being able to peer only with other nodes within the same boundaries. An illustrative recommendation may suggest that subnetwork boundaries be expanded (e.g., from a /24 CIDR block to a /22 block) or constricted (e.g., from a /23 CIDR block to a /24 block).

In these embodiments, content transfer events are received and recorded over a period of time (e.g., days, weeks, months) for multiple content items distributed within a number of clusters within the network. The sizes of the clusters are determined (e.g., the number of nodes attached to the cluster), and pertinent network settings that were active during the content distribution are identified. In particular, the cluster boundary or boundaries are identified, which may take the form of a range of network (e.g., IP) addresses, a subnetwork or subnet mask, one or more CIDR (Classless Inter-Domain Routing) blocks, etc.

Then a subnet recommendation engine determines whether and how, if the size or breadth of a subnetwork changed (e.g., from a /24 to a /23 CIDR block), two or more relatively small clusters would merge and yield a larger average, or a relatively large cluster would fragment into smaller clusters. This hypothesis is repeated for a range of different sizes (e.g., down to /16), and the engine determines at which point (at which subnet size) the average cluster size would likely reach a target (e.g., 20, between 15 and 20, between 20 and 25). The target size may be a size (or a range of sizes) that has historically yielded the greatest bandwidth savings, which may be calculated as described above.

Figure 3:
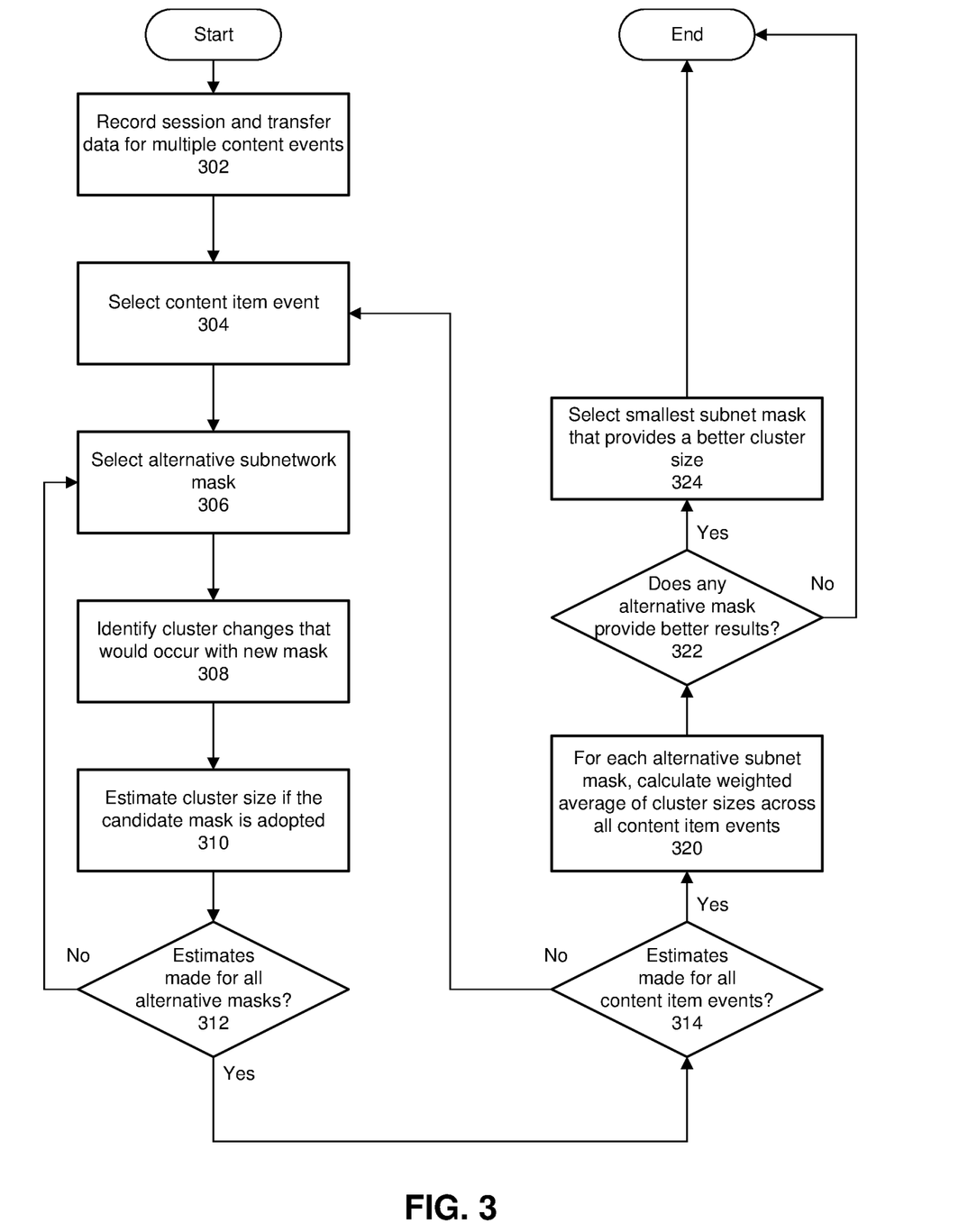
FIG. 3 is a flowchart illustrating a method of recommending a change in the boundary of a peer-managed content distribution network or a cluster within the network, in accordance with some embodiments.

FIG. 3 is a flowchart illustrating a method of recommending a change in the boundary of a synthetic peer-managed content distribution network or a cluster within the network, according to some embodiments. In one or more embodiments, one or more of the operations may be omitted, repeated, and/or performed in a different order. Accordingly, the specific arrangement of steps shown in FIG. 3 should not be construed in a manner that limits the scope of the embodiments.

A goal of the illustrated method is to compare an average cluster size, measured in terms of node population, based on current network configuration parameters (e.g., with a particular default subnetwork mask that identifies cluster boundaries) with cluster sizes that would likely result from changing the parameters (e.g., by changing the default subnetwork mask).

In operation 302, some or all of the data described above that are reported by network nodes are recorded for each content item event (i.e., the distribution of a content item via the network) that occurs during a particular time period, such as the past three months. In particular, the recorded data may include each participating node's subnetwork address and the network's applicable subnetwork mask extracted from session metadata.

The mask identifies the logical boundary of each cluster of the network, beyond which a node attached to the cluster cannot establish a peer connection. The reach of each content item is also recorded, and content item events that had reaches lower than a threshold (e.g., 100) may be omitted from participation in the recommendation process.

In operation 304, one of the past content item events is selected for examination.

In operation 306, a candidate alternative subnetwork mask is selected for consideration. In the illustrated method, a predetermined range of masks or CIDR blocks is identified (e.g., from /24 to /16), and all masks are considered for possible implementation in place of the current default mask, one at a time, to determine whether it would have likely provided a cluster size closer to the target size.

Note, however, that depending on the average cluster size for the current default subnetwork mask, some alternative masks may be ignored and not considered. In particular, if the current average cluster size is below the target size, masks that would likely restrict clusters to even smaller numbers of nodes may be omitted from consideration. Similarly, if the current average cluster size is above the target size (e.g., by some amount or percentage), alternative masks that would likely cause even more nodes to join a cluster may be omitted from consideration.

In operation 308, changes in cluster configurations that would likely have occurred if the alternative mask had been in place during the event are determined. For example, if a /24 mask was in force during the event, and an alternative mask that provides a larger range of addresses is currently under consideration (e.g., a /23 mask), nodes in two or more of the clusters that formed in accordance with the /24 mask may have formed one larger cluster because they would be in the address space of the same /23 network.

Conversely, if a /23 mask was in force during the event, and a mask that provides a smaller range of addresses is under consideration (e.g., a /24 mask), the cluster may have been broken into multiple smaller clusters.

In operation 310, the potential effect on cluster size that would result if the alternative mask was adopted is determined. For example, if the alternative mask provides a smaller address space (e.g., a potential change from /23 to /24), addresses of nodes that joined each cluster while the /23 mask was in force can be examined to identify and count those that would fall into each of the smaller address ranges provided by the alternative mask and therefore join the cluster associated with each /24 CIDR block.

Similarly, if the alternative mask provides a larger address space (e.g., a potential change from /24 to /23), the total number of nodes that would have been included in a cluster associated with the /23 CIDR block can be determined by summing the population of each cluster associated with the /24 blocks. The estimated cluster size for each cluster that would potentially form under the alternative mask is saved, and the average cluster size across the entire content item event is also saved.

In operation 312, the method determines whether all alternative masks have been investigated. If so, the method advances to operation 314; otherwise, it returns to operation 306 to select another alternative mask.

In operation 314, the method determines whether all content item events have been investigated. If so, the method advances to operation 320; otherwise, it returns to operation 304 to select a different content item event.

In operation 320, for each alternative subnetwork mask that was considered (e.g., /24 to /16), the weighted average of the average cluster sizes across all content items is calculated. The estimated cluster size for each content item is weighted (e.g., multiplied) by the number of nodes involved in the event, across all clusters.

In operation 322, the method compares the average cluster size provided by the currently applicable subnet mask to the weighted average cluster sizes for each candidate alternative mask, to determine whether any of them is closer to the target size. If so, the method advances to operation 324; otherwise, the method ends.

In operation 324, the smallest alternative subnetwork mask (i.e., the mask that corresponds to the smallest range of network address) that provides a better estimated cluster size is selected. The selected mask may be provided as a recommendation to a network administrator. In some cases, it may be automatically implemented (e.g., on a provisional basis).

After operation 324 the method ends. The illustrated method may be repeated on a regular basis (e.g., weekly, monthly), at which time some older content item events may no longer be counted and some new ones may be added to the computations.

By configuring privacy controls or settings as they desire, members of a network, a subnetwork, or other collections of users that may use or interact with embodiments described herein can control or restrict the information collected from them, the information that is provided to them, their interactions with such information and with other members, and/or how such information is used. Implementation of an embodiment described herein is not intended to supersede or interfere with the users' privacy settings.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of measuring performance of a content distribution network, the method comprising:
   at each of a subset of nodes of the network:
      establishing persistent connections with one or more peer nodes in the subset;
      recording transfer events associated with sharing of a content item via the persistent connections; and
      transmitting the transfer events toward a supervisor of the network; and
   at the supervisor:
      calculating a conservation of bandwidth provided by the subset of nodes with regard to the content item, as a ratio between an amount of the content item received at the subset of nodes via the persistent connections and a total amount of the content item received by the subset of nodes.

2. The method of claim 1, wherein the total amount of the content item received by the subset of nodes comprises an amount of the content item received from one or more sources external to the network.

3. The method of claim 1, further comprising, at the supervisor:
   calculating an efficiency of the subset of nodes regarding the content item by dividing the bandwidth conservation by a maximum possible bandwidth savings based on a number of nodes in the subset of nodes.

4. The method of claim 3, further comprising, at the supervisor:
   calculating an efficiency of a second subset of nodes regarding the content item by dividing a bandwidth conservation provided by the second subset of nodes by a maximum possible bandwidth savings based on a number of nodes in the second subset of nodes; and
   calculating an efficiency of the network by combining the efficiencies of the first subset of nodes and the second subset of nodes.

5. The method of claim 1, further comprising, at each node in the subset of nodes:
   collecting presentation events related to presentation of the content item to a user associated with the node; and
   transmitting the presentation events toward the supervisor.

6. The method of claim 5, further comprising, at the supervisor:
   calculating a quality of experience of the user with regard to the content item by dividing a total play time of the content item to the user by a total time of user engagement with the content item.

7. The method of claim 6, wherein the total time of user engagement with the content item comprises:
   an amount of time between initiation by the user of the presentation and commencement of the presentation by a media player;
   the total play time; and
   a total amount of time the presentation stalls while the media player awaits more of the content item.

8. The method of claim 1, further comprising at each node in the subset of nodes:
collecting session metadata regarding a user associated with the node and/or an environment in which the node operates; and
transmitting the session metadata toward the supervisor.

9. The method of claim 8, further comprising, at the supervisor:
using the session metadata received from the subset of nodes to determine a total number of users to whom the content item was presented.

10. The method of claim 1, further comprising at each node in the subset of nodes:
transmitting toward the supervisor presentation events reflecting presentation of the content item to a user; and
transmitting toward the supervisor session metadata regarding an operational environment of the node and/or the user associated with the node.

11. A non-transitory computer-readable medium storing instructions that, when executed by a processor, cause the processor to perform a method of measuring performance of a content distribution network, the method comprising:
at each of a subset of nodes of the network:
establishing persistent connections with one or more peer nodes in the subset;
recording transfer events associated with sharing of a content item via the persistent connections; and
transmitting the transfer events toward a supervisor of the network; and
at the supervisor:
calculating a conservation of bandwidth provided by the subset of nodes with regard to the content item, as a ratio between an amount of the content item received at the subset of nodes via the persistent connections and a total amount of the content item received by the subset of nodes.

12. A content distribution network comprising:
a plurality of electronic devices, each device comprising:
at least one processor; and
memory storing instructions that, when executed by the at least one processor, cause the device to instantiate a software node of the network and, at each node:
establish persistent connections with one or more peer nodes in a subset of nodes of the network hosted by the electronic devices;
record transfer events associated with sharing of a content item via the persistent connections; and
transmit the transfer events toward a supervisor of the network; and
one or more computer servers, each computer server comprising:
one or more processors; and
memory storing instructions that, when executed by the one or more processors, cause the computer server to:
calculate a conservation of bandwidth provided by the subset of nodes with regard to the content item, as a ratio between an amount of the content item received at the subset of nodes via the persistent connections and a total amount of the content item received by the subset of nodes.

13. The content distribution network of claim 12, wherein the total amount of the content item received by the subset of nodes comprises an amount of the content item received from one or more sources external to the network.

14. The content distribution network of claim 12, wherein the memory of each computer server further stores instructions that, when executed by the one or more processors, cause the computer server to:
calculate an efficiency of the subset of nodes regarding the content item by dividing the bandwidth conservation by a maximum possible bandwidth savings based on a number of nodes in the subset of nodes.

15. The content distribution network of claim 14, wherein the memory of each computer server further stores instructions that, when executed by the one or more processors, cause the computer server to:
calculate an efficiency of a second subset of nodes regarding the content item by dividing a bandwidth conservation provided by the second subset of nodes by a maximum possible bandwidth savings based on a number of nodes in the second subset of nodes; and
calculate an efficiency of the network by combining the efficiencies of the first subset of nodes and the second subset of nodes.

16. The content distribution network of claim 12, wherein the memory of each electronic device further stores instructions that, when executed by the at least one processor, cause the device to:
collect presentation events related to presentation of the content item to a user associated with the node; and
transmit the presentation events toward the supervisor.

17. The content distribution network of claim 16, wherein the memory of each computer server further stores instructions that, when executed by the one or more processors, cause the computer server to:
calculate a quality of experience of the user with regard to the content item by dividing a total play time of the content item to the user by a total time of user engagement with the content item.

18. The content distribution network of claim 17, wherein the total time of user engagement with the content item comprises:
an amount of time between initiation by the user of the presentation and commencement of the presentation by a media player;
the total play time; and
a total amount of time the presentation stalls while the media player awaits more of the content item.

19. The content distribution network of claim 12, wherein the memory of each electronic device further stores instructions that, when executed by the at least one processor, cause the device to:
collect session metadata regarding a user associated with the node and/or an environment in which the node operates; and
transmit the session metadata toward the supervisor.

20. The content distribution network of claim 19, wherein the memory of each computer server further stores instructions that, when executed by the one or more processors, cause the computer server to:
use the session metadata received from the subset of nodes to determine a total number of users to whom the content item was presented.

21. The content distribution network of claim 12, wherein the memory of each electronic device further stores instructions that, when executed by the at least one processor, cause the device to:
transmit toward the supervisor presentation events reflecting presentation of the content item to a user; and
transmit toward the supervisor session metadata regarding an operational environment of the node and/or the user associated with the node.

* * * * *